US010760992B2

(12) United States Patent
Kashiwagi

(10) Patent No.: US 10,760,992 B2
(45) Date of Patent: Sep. 1, 2020

(54) OPTICAL POWER MONITOR DEVICE AND OPTICAL POWER MONITOR METHOD

(71) Applicant: FUJIKURA LTD., Tokyo (JP)

(72) Inventor: Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 564 days.

(21) Appl. No.: 15/440,247

(22) Filed: Feb. 23, 2017

(65) Prior Publication Data

US 2017/0160167 A1   Jun. 8, 2017

Related U.S. Application Data

(63) Continuation of application No. PCT/JP2015/078067, filed on Oct. 2, 2015.

(30) Foreign Application Priority Data

Oct. 6, 2014   (JP) .................................. 2014-205603

(51) Int. Cl.
*G01M 11/00* (2006.01)
*H01S 3/067* (2006.01)
(Continued)

(52) U.S. Cl.
CPC .............. *G01M 11/31* (2013.01); *G01J 1/02* (2013.01); *G01M 11/33* (2013.01); *G01M 11/37* (2013.01);
(Continued)

(58) Field of Classification Search
CPC ...... G01M 11/31; G01M 11/33; G01M 11/37; G01J 1/02; G02B 6/4291; G02B 6/4296;
(Continued)

(56) References Cited

U.S. PATENT DOCUMENTS 4,618,212 A * 10/1986 Ludington ........... G02B 6/2551
356/73.1
5,040,866 A *  8/1991 Engel ..................... G01M 11/33
385/32
(Continued)

FOREIGN PATENT DOCUMENTS

CN      102105828 A     6/2011
CN      102322945 A     1/2012
(Continued)

OTHER PUBLICATIONS

Office Action dated Aug. 17, 2018, issued in counterpart Chinese Application No. 201580046196.0. (4 pages).
(Continued)

*Primary Examiner* — Georgia Y Epps
*Assistant Examiner* — Don J Williams
(74) *Attorney, Agent, or Firm* — Westerman, Hattori, Daniels & Adrian, LLP

(57) ABSTRACT

An optical power monitor device includes a first optical fiber, including a core and a cladding surrounding the core and being at least one of an incidence-side optical fiber and a launch-side optical fiber connected to each other at a connection point, which is constituted by a curve portion and a linear portion between the curve portion and the connection point, a low refractive index layer that is provided in at least a portion of the linear portion on an outer side of the cladding and has a refractive index lower than a refractive index of the cladding, and a first optical detector that is provided at a position close to at least the curve portion.

11 Claims, 4 Drawing Sheets

(51) Int. Cl.
*H01S 3/00* (2006.01)
*G01J 1/02* (2006.01)
*G02B 6/42* (2006.01)
*H01S 3/13* (2006.01)
*H01S 3/131* (2006.01)

(52) U.S. Cl.
CPC .............. *G02B 6/4289* (2013.01); *H01S 3/00* (2013.01); *H01S 3/0014* (2013.01); *H01S 3/067* (2013.01); *H01S 3/06704* (2013.01); *H01S 3/06708* (2013.01); *G02B 6/4291* (2013.01); *G02B 6/4296* (2013.01); *H01S 3/1306* (2013.01); *H01S 3/1312* (2013.01)

(58) Field of Classification Search
CPC ....... G02B 6/4289; H01S 3/00; H01S 3/0014; H01S 3/067; H01S 3/06704; H01S 3/07708; H01S 3/1306; H01S 3/1312
See application file for complete search history.

(56) References Cited

U.S. PATENT DOCUMENTS

| | | | |
|---|---|---|---|
| 5,179,275 A | | 1/1993 | Lieber et al. |
| 6,477,307 B1 * | | 11/2002 | Tankala ............ C03B 37/01211 |
| | | | 385/127 |
| 2006/0147168 A1 * | | 7/2006 | DeMartino ........... C03C 25/106 |
| | | | 385/128 |
| 2006/0165343 A1 | | 7/2006 | Seifert |
| 2011/0140011 A1 | | 6/2011 | Uchida |

FOREIGN PATENT DOCUMENTS

| | | |
|---|---|---|
| CN | 102645320 A | 8/2012 |
| DE | 43 13 795 A1 | 11/1994 |
| GB | 2458304 A | 9/2009 |
| JP | 2005-128099 A | 5/2005 |
| JP | 2008-51735 A | 3/2008 |
| JP | 2010-32272 A | 2/2010 |
| JP | 2011-44617 A | 3/2011 |
| JP | 2011-192670 A | 9/2011 |
| JP | 2013-174583 A | 9/2013 |

OTHER PUBLICATIONS

Japanese Office Action dated Oct. 6, 2015, issued in counterpart Japanese Patent Application No. 2014-205603 (3 pages).
Japanese Notice of Allowance dated Dec. 18, 2015, issued in counterpart Japanese Patent Application No. 2014-205603 (3 pages).
Extended Search Report dated Mar. 16, 2018, issued in counterpart European Application No. 15849086.2 (9 pages).
Office Action dated Nov. 9, 2017, issued in counterpart Chinese Application No. 201580046196.0. (6 pages).

* cited by examiner

OPTICAL POWER MONITOR DEVICE AND OPTICAL POWER MONITOR METHOD

CROSS REFERENCE TO RELATED APPLICATIONS

This application is a continuation application based on a PCT Patent Application No. PCT/JP2015/078067, filed Oct. 2, 2015, whose priority is claimed on Japanese Patent Application No. 2014-205603, filed Oct. 6, 2014, the entire content of which are hereby incorporated by reference.

BACKGROUND OF THE INVENTION

Field of the Invention

The present invention relates to an optical power monitor device and an optical power monitor method.

BACKGROUND ART

Description of the Related Art

In recent years, fiber lasers have been capable of achieving an output optical power exceeding 1 kW by high luminance of a semiconductor laser for pumping or the commercialization of a double clad fiber for amplification. In recent years, such high-power fiber lasers have been applicable to a material processing field in which carbon dioxide gas lasers have been mainly used. The fiber laser is more excellent in beam quality and a light harvesting property than the carbon dioxide gas laser. For this reason, the high-power fiber laser exhibits an excellent effect. For example, a processing time can be reduced, and a throughput is improved. In addition, processing characteristics can be realized even with lower power, and are equivalent to those in a case of high power, thereby achieving energy saving. Further, since a free-space optical component is not necessary, there is no problem such as durability and the alignment of optical components, and there is also an advantage that maintenance is not necessary.

On the other hand, material processing using the fiber laser has the following problems.

For example, when light reflected from a processed surface returns to the fiber laser during the material processing, an oscillation state becomes unstable. As a result, an output optical power fluctuates, and thus processing characteristics are deteriorated. In the worst case, the unstable oscillation changes to random pulse oscillation, which causes a defect in a pumping light source, a break in the fiber, and the like, and thus the fiber laser becomes defective. In order to cope with such a kind of problem, it is necessary to previously prevent the oscillation state from becoming unstable by monitoring a reflected light power and an output optical power.

Methods of monitoring a reflected light power and an output optical power include a method of connecting an optical fiber coupler having a low branching ratio to an output fiber and receiving output light and reflected light, which are obtained by branching, by a photodiode or the like to thereby monitor an output optical power and a reflected light power.

As another method, Japanese Unexamined Patent Application, First Publication No. 2013-174583 discloses a method of receiving light leaked from a fusion splicing point of an optical fiber by a photodiode disposed in the vicinity of the fusion splicing point, or the like and monitoring an output optical power and a reflected light power on the basis of the power of the leaked light.

In a case where the optical fiber coupler having a low branching ratio is used, there is a problem in that the durability of the optical fiber coupler with respect to high-power light is low. In addition, there may be a problem such as an increase in cost due to the addition of an optical fiber coupler or efficiency degradation due to an increase in the number of connection points between components. On the other hand, in a case where monitoring is performed using light leaked from the fusion splicing point, output light leaked from the fusion splicing point is received by both a photodiode for monitoring output light and a photodiode for monitoring reflected light. Similarly, reflected light leaked from the fusion splicing point is received by both the photodiode for monitoring output light and the photodiode for monitoring reflected light.

For this reason, for example, even when reflected light is not present, there is a problem in that light is detected as if reflected light is present. In addition, in a case where reflected light is present, there is a problem in that a large output optical power is detected. As measures for such problems, for example, it is considered that the photodiode is kept away from the fusion splicing point. However, even when the photodiode is kept away from the fusion splicing point, there are problems in that scattered light is received by the photodiode and light to be monitored tends to be affected by noise due to a reduction in the power itself of the light.

An aspect of the invention is contrived in order to solve such problems, and an object thereof is to provide an optical power monitor device and an optical power monitor method which are capable of monitoring the power of output light or reflected light with a high level of accuracy.

SUMMARY

In order to achieve the above-described object, an optical power monitor device according to a first aspect of the invention includes a first optical fiber, including a core and a cladding surrounding the core and being at least one of an incidence-side optical fiber and a launch-side optical fiber connected to each other at a connection point, which is constituted by a curve portion and a linear portion positioned between the curve portion and the connection point, a low refractive index layer that is provided in at least a part of the linear portion on an outer side of the cladding and has a refractive index lower than a refractive index of the cladding, and a first optical detector that is provided at a position close to the curve portion.

In the optical power monitor device according to the aspect, the low refractive index layer having a refractive index lower than the refractive index of the cladding is provided in at least a portion of the linear portion of the first optical fiber on the outer side of the cladding. Thereby, light leaked at the connection point is trapped in the low refractive index layer, that is, the cladding and the core of the first optical fiber. The light trapped in the low refractive index layer advances inside the linear portion from the connection point side and then reaches the curve portion, and a part of the light is leaked out in the curve portion. The leaked light is detected by the first optical detector provided in the vicinity of the curve portion.

For example, when it is assumed that the first optical fiber is the incidence-side optical fiber, reflected light leaked at the connection point is guided in a state of being trapped in the low refractive index layer, and leaks in the curve portion, and then it is detected by the first optical detector. On the other hand, output light leaked at the connection point advances to a side opposite to the first optical fiber, and thus is hardly present in the curve portion. Therefore, the first optical detector can detect the reflected light separately from the output light at a position away from the connection point. In this manner, according to the aspect, it is possible to realize the optical power monitor device capable of monitoring the power of the output light or the reflected light with a high level of accuracy.

Here, one of the incidence-side optical fiber and the launch-side optical fiber may be the first optical fiber, the other may be a second optical fiber constituting the linear portion, and a second optical detector may be provided at a position overlapping the second optical fiber when seen in a plan view.

In the aspect, reflected light leaked at the connection point is detected by the first optical detector in the curve portion. However, in a case where the second optical detector is provided at a position overlapping the second optical fiber when seen in a plan view, output light leaked at the connection point is detected by the second optical detector. Therefore, it is possible to realize the optical power monitor device capable of monitoring both the power of the output light and the power of the reflected light with a high level of accuracy.

The optical power monitor device according to the aspect may further include a supporting member that includes a groove accommodating the first optical fiber therein, and a filler that is buried in a vicinity of the first optical fiber and has a refractive index equal to or higher than a refractive index of the cladding.

In the above aspect, the first optical fiber is supported by the supporting member in a state where the first optical fiber is surrounded by the filler having a refractive index equal to or higher than the refractive index of the cladding. Thereby, it is possible to leak out the light which is trapped in the cladding from the curve portion and to be incident on the first optical detector through the filler with a high level of efficiency.

Furthermore, a part of inner surface of the groove which corresponds to a position of the curve portion may have a light scattering property.

In the above aspect, light leaked out from the curve portion is scattered on the inner surface of the groove having a light scattering property and advances toward all directions. Thereby, the degree of freedom of the arrangement of the first optical detector is increased.

Furthermore, a part of inner surface of the groove which corresponds to a position of the connection point may have a light absorbing property.

In the aspect, light leaked out from the connection portion is absorbed and attenuated by the inner surface of the groove having a light absorbing property. Thereby, it is possible to suppress the detection of unintended leaked light by the first optical detector.

Furthermore, the first optical detector may be provided at a position overlapping the curve portion of the first optical fiber when seen in a plan view.

In this case, it is possible to leak out light from the curve portion to be incident on the first optical detector with a high level of efficiency.

An optical power monitor method according to a second aspect of the invention includes preparing a first optical fiber which includes a core and a cladding surrounding the core and is at least one of an incidence-side optical fiber and a launch-side optical fiber connected to each other at a connection point, providing a low refractive index layer having a refractive index lower than a refractive index of the cladding in at least a portion on an outer side of the cladding, forming a curve portion by curving a portion of the first optical fiber, and detecting leaked light of output light or reflected light, which is guided toward the curve portion from the connection point, in the curve portion.

In the optical power monitor method according to the second aspect, the low refractive index layer having a refractive index lower than the refractive index of the cladding is provided in at least a portion on the outer side of the cladding of the first optical fiber. Thereby, light leaked at the connection point is trapped in the low refractive index layer, that is, in the cladding and the core of the first optical fiber. The light trapped in the low refractive index layer reaches the curve portion, and a part of the light is leaked out from the curve portion. The leaked light is detected. For example, when it is assumed that the first optical fiber is the incidence-side optical fiber, reflected light leaked at the connection point is leaked out from the curve portion and is detected. On the other hand, output light leaked at the connection point advances to a side opposite to the first optical fiber, and thus is hardly present in the curve portion. In this manner, according to the aspect, it is possible to realize the optical power monitor method capable of monitoring the power of output light or reflected light with a high level of accuracy.

According to the aspects of the invention, it is possible to realize an optical power monitor device and an optical power monitor method which are capable of monitoring the power of output light or reflected light with a high level of accuracy.

DETAILED DESCRIPTION OF THE PREFERRED EMBODIMENTS

First Embodiment

Hereinafter, a first embodiment of the invention will be described with reference to FIGS. 1 to 3.

In this embodiment, an example of an optical power monitor device capable of monitoring both the power of output light and the power of reflected light will be described.

Figure 1:
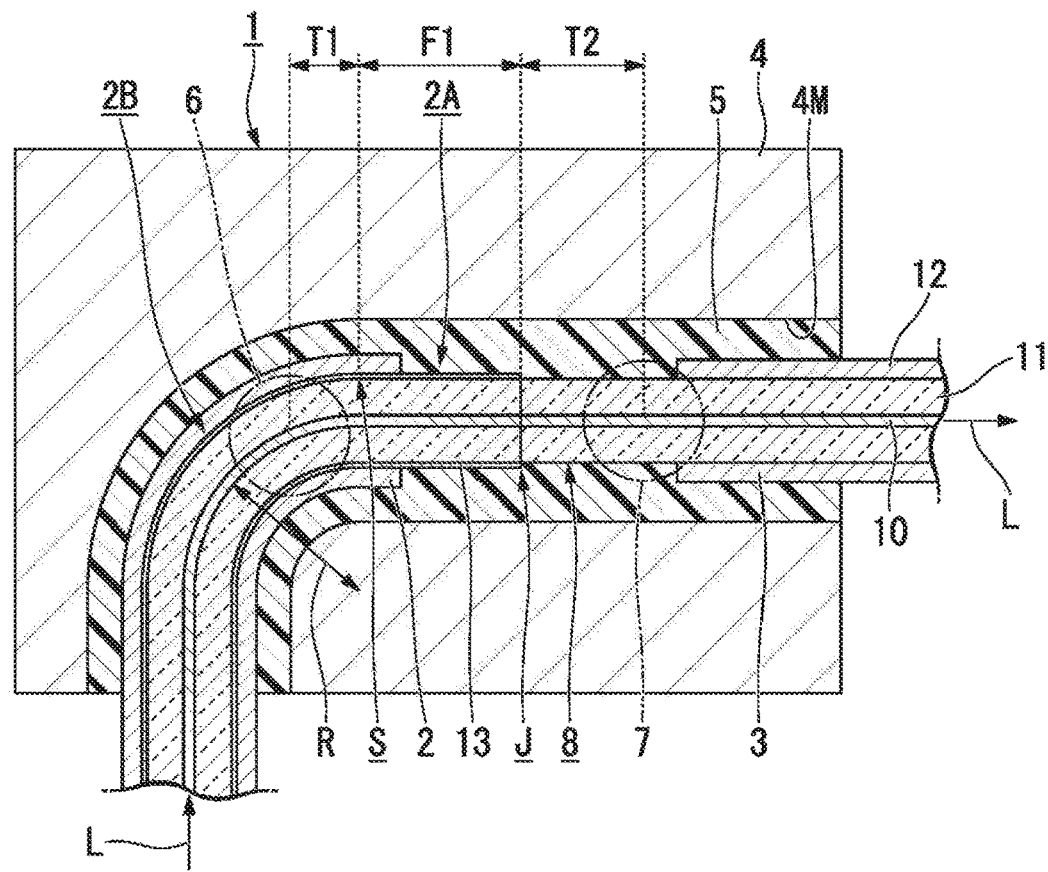
FIG. 1 is a cross-sectional view of an optical power monitor device according to a first embodiment of the invention.

FIG. 1 is a cross-sectional view of an optical power monitor device according to a first embodiment. FIG. 2 is a side view of the optical power monitor device. FIG. 3 is a diagram illustrating operations of the optical power monitor device.

For convenience of understanding of components in the following drawings, the components may be illustrated with different scales of dimensions.

Figure 2:
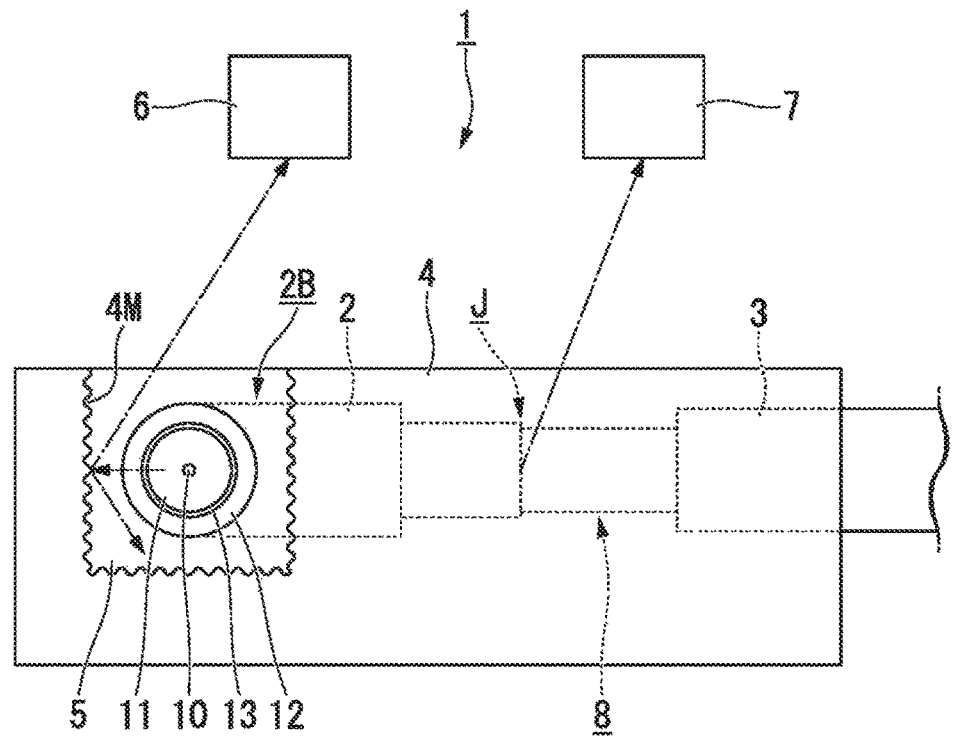
FIG. 2 is a side view of the optical power monitor device.

As illustrated in FIGS. 1 and 2, an optical power monitor device 1 according to the first embodiment includes an incidence-side optical fiber 2 (first optical fiber), a launch-side optical fiber 3 (second optical fiber), a supporting member 4, a filler 5, a reflected light monitoring optical detector 6 (first optical detector), and an output light monitoring optical detector 7 (second optical detector). The incidence-side optical fiber 2 and the launch-side optical fiber 3 are fusion-spliced together. As indicated by an arrow L, light advances toward the launch-side optical fiber 3 from the incidence-side optical fiber 2. Hereinafter, the incidence-side optical fiber 2 and the launch-side optical fiber 3 which are fusion-spliced together as one body will be referred to as an optical fiber 8. In addition, a fusion-spliced surface by a contact between an end of the incidence-side optical fiber 2 and an end of the launch-side optical fiber 3 will be referred to as a connection point J.

When a light incident side is seen from the connection point J, the incidence-side optical fiber 2 linearly extends from the connection point J by a predetermined distance F1 and is curved in the form of an arc from a position away from the connection point J by the predetermined distance F1. That is, the incidence-side optical fiber 2 includes a linear portion 2A between the connection point J and a position at which the incidence-side optical fiber 2 starts to be curved, and a curve portion 2B in which the incidence-side optical fiber 2 is curved.

Hereinafter, a position at which the incidence-side optical fiber 2 starts to be curved when seen from the connection point J side will be referred to as a curve start point S. That is, the curve start point S is an end of the curve portion 2B, and is a boundary between the linear portion 2A and the curve portion 2B.

On the other hand, the launch-side optical fiber 3 does not have a curve portion and linearly extends. That is, the launch-side optical fiber 3 includes a linear portion 3A. As a specific example, for example, a length F1 of the linear portion 2A of the incidence-side optical fiber 2 is 35 mm, and a radius of curvature R of the curve portion 2B is 30 mm.

The optical fiber 8 has a two-layered structure of a core 10 and a cladding 11 surrounding the core 10. The outer side of the cladding 11 is covered with a coating 12. Constituent materials of the core 10, the cladding 11, and the coating 12 are materials used for general optical fiber. The coating 12 is formed of a material having a refractive index higher than the refractive index of the cladding 11. The coating 12 is peeled off within a range of a predetermined distance from the connection point J, and the cladding 11 is exposed. As a specific example, for example, the diameter of the core 10 is 8 μm, the diameter of the cladding 11 is 125 μm, and NA of the core 10 is 0.06.

A low refractive index layer 13 having a refractive index lower than the refractive index of the cladding 11 is provided on the outer side of the cladding 11 of the incidence-side optical fiber 2. The thickness of the low refractive index layer 13 is, for example, approximately 3 μm. As a material of the low refractive index layer 13, for example, glass having a dopant such as fluorine or boron added thereto can be used. In FIG. 1, the low refractive index layer 13 is provided on the entire surface of the cladding 11 of the incidence-side optical fiber 2, but may be provided in at least the linear portion 2A between the connection point J and the curve start point S. In addition, the low refractive index layer 13 may not be necessarily provided in the entire linear portion 2A, or may be provided in a part of the linear portion 2A. In a case where the low refractive index layer 13 is provided in a part of the linear portion 2A, the position of the low refractive index layer 13 is not particularly limited. However, in order to more reliably trap the light leaked from the connection point J, it is preferable that the low refractive index layer 13 is provided in a portion on a side close to the connection point J of the linear portion 2A.

The supporting member 4 supports the optical fiber 8, and particularly functions as a reinforcement material for reinforcing the strength of the vicinity of the connection point J. In the drawing, the supporting member 4 is illustrated as a rectangular parallelepiped member, but the shape of the supporting member 4 is not particularly limited to a rectangular parallelepiped. A groove 4M having such a size as to accommodate the optical fiber 8 therein is provided in the upper surface of the supporting member 4. The optical fiber 8 is fixed to the supporting member 4 in a state of being accommodated in the groove 4M. The supporting member 4 is formed of, for example, aluminum having been subjected to black alumite treatment. In this embodiment, the shape of the groove 4M corresponds to the shape of the optical fiber 8, and thus groove includes a linear portion and a curve portion. The width of the groove 4M is, for example, 1 mm. However, the shape and width of the groove 4M are not particularly limited.

The groove 4M is filled with the filler 5 so as to fill the vicinity of the optical fiber 8. In the optical fiber 8, the coating 12 is peeled off in the vicinity of the connection point J, and thus the filler 5 in the vicinity of the connection point J is directly in contact with the cladding 11 in the launch-side optical fiber 3, and is directly in contact with the low refractive index layer 13 in the incidence-side optical fiber 2. The filler 5 is formed of a material having a refractive index which is equal to or higher than the refractive index of the cladding 11.

For example, a resin material or glass may be used for the filler 5. In a case where the resin material is used for the filler 5, the filler 5 can be formed by a method of inserting the resin material into the groove and then hardening the resin material. In this case, it is possible to obtain an advantage that the filler 5 can be buried in the groove 4M without a gap.

As illustrated in FIG. 2, fine irregularities are provided in the inner wall surface of the groove 4M. Thereby, a light scattering property is imparted to the inner wall surface of the groove 4M. However, a light scattering property may not be imparted to the entire inner wall surface of the groove 4M, and a light scattering property may be imparted to at least a part facing the curve portion 2B of the incidence-side optical fiber 2 in the inner wall surface of the groove 4M. Alternatively, for example, another member having a light scattering property, that is, a so-called scatterer may be inserted into the groove 4M, as member for imparting a light scattering property to the inner wall surface of the groove 4M. As such a type of member, for example, a scatterer formed of crystallized glass having a light scattering property can be used. On the other hand, in the inner wall surface of the groove 4M, the inner wall surface in the vicinity of the connection point J may have a light absorbing property.

As illustrated in FIG. 2, the reflected light monitoring optical detector 6 is provided above the optical fiber 8, that is, facing a surface on which the groove 4M of the supporting member 4 is provided. As illustrated in FIG. 1, the reflected light monitoring optical detector 6 is provided at a position overlapping the curve portion 2B of the incidence-side optical fiber 2 when seen from a direction perpendicular to the surface on which the groove 4M of the supporting member 4 is provided. The reflected light monitoring optical detector 6 is provided above the curve portion 2B, for example, at a distance T1 of 10 mm from the curve start point S.

As illustrated in FIG. 2, the output light monitoring optical detector 7 is provided above the optical fiber 8, that is, facing the surface on which the groove 4M of the supporting member 4 is provided, similar to the reflected light monitoring optical detector 6. The output light monitoring optical detector 7 is provided at a position overlapping the launch-side optical fiber 3 when seen in a plan view, and specifically, when seen from a direction perpendicular to the surface on which the groove 4M of the supporting member 4 is provided. As illustrated in FIG. 1, the output light monitoring optical detector 7 is provided above the launch-side optical fiber 3, for example, at a distance T2 of 10 mm from the connection point J. For example, an infrared photodiode can be used as the reflected light monitoring optical detector 6 and the output light monitoring optical detector 7, but other kinds of optical detectors may be used.

As described above, in a case where a fiber laser is used for, for example, laser processing, an output optical power fluctuates when light reflected from a processed surface returns to the fiber laser during the processing of a material, which may result in a deterioration of processing characteristics. For this reason, an optical power monitor device for monitoring a reflected light power and an output optical power is required. However, in an optical power monitor device of the related art, two optical detectors of an optical detector for monitoring output light and an optical detector for monitoring reflected light are disposed in proximity to each other in the vicinity of a connection point of an optical fiber. For this reason, as a result of output light leaked from the connection point and reflected light being respectively incident on both the optical detectors, there is a problem in that detection accuracy is degraded.

On the other hand, in the optical power monitor device 1 according to this embodiment, the low refractive index layer 13 having a refractive index lower than the refractive index of the cladding 11 is provided on the outer side of the cladding 11 of the incidence-side optical fiber 2. For this reason, as illustrated in FIG. 3, in a case where the low refractive index layer 13 is not present, reflected light Lr leaked out to the outside from the connection point is trapped in the cladding 11 by the low refractive index layer 13 and advances toward the curve portion 2B. In this manner, the reflected light Lr is trapped in the cladding 11 of the incidence-side optical fiber 2, and thus it is possible to drastically reduce the reflected light Lr which is leaked to the outside from the connection point J and is detected by the output light monitoring optical detector 7. As a result, it is possible to increase the detection accuracy of an output optical power of the output light monitoring optical detector 7. In order to further reduce reflected light serving as noise, it is particularly preferable that the inner wall surface of the groove 4M in the vicinity of the connection point J has a light absorbing property so that the reflected light Lr slightly leaked out from the connection point J is not scattered.

The reflected light Lr advancing inside the incidence-side optical fiber 2 is repeatedly totally reflected from an interface between the low refractive index layer 13 and the cladding 11 in a state where an incident angle θ0 with respect to the interface is maintained when the reflected light advances to the linear portion 2A. However, when the reflected light Lr is incident on the curve portion 2B, the interface between the low refractive index layer 13 and the cladding 11 is curved, and thus incident angles θ1 and θ2 of the reflected light Lr with respect to the interface become smaller than the incident angle θ0 in the linear portion 2A. Thereby, the reflected light Lr having the incident angles θ1 and θ2 being smaller than a critical angle is leaked out of the low refractive index layer 13 from the curve portion 2B. The reflected light Lr leaked out of the low refractive index layer 13 is scattered on the inner wall surface of the groove 4M through the coating 12 and the filler 5 as illustrated in FIG. 2, and is incident on the reflected light monitoring optical detector 6. In this manner, a reflected light power is measured by the reflected light monitoring optical detector 6. In addition, the reflected light monitoring optical detector 6 is disposed at a position overlapping the curve portion 2B when seen in a plan view, and is located at a position distant from the connection point J.

For this reason, it is possible to drastically reduce output light which is leaked from the connection point J and is incident on the reflected light monitoring optical detector 6. As a result, it is possible to increase the detection accuracy of the reflected light power of the reflected light monitoring optical detector 6.

As described above, according to the optical power monitor device 1 of this embodiment, it is possible to detect leaked light beams of output light and reflected light in a state where the leaked light beams are separated from each other. Thereby, it is possible to realize the optical power monitor device capable of monitoring both an output optical power and a reflected light power with a high level of accuracy.

As a result of the monitoring of light power during the use of a fiber laser, for example, in a case where a reflected light power exceeds an allowable value, a control unit of the fiber laser may perform control of decreasing a driving current to be supplied to a pumping laser. At this time, the control unit may perform APC controls. How to use monitoring results obtained by the optical power monitor device is not particularly limited in the invention.

Second Embodiment

Hereinafter, a second embodiment of the invention will be described with reference to FIG. 4.

A basic configuration of an optical power monitor device according to the second embodiment is the same as that of the first embodiment, and the position of a reflected light monitoring optical detector is different from that in the first embodiment.

Figure 4:
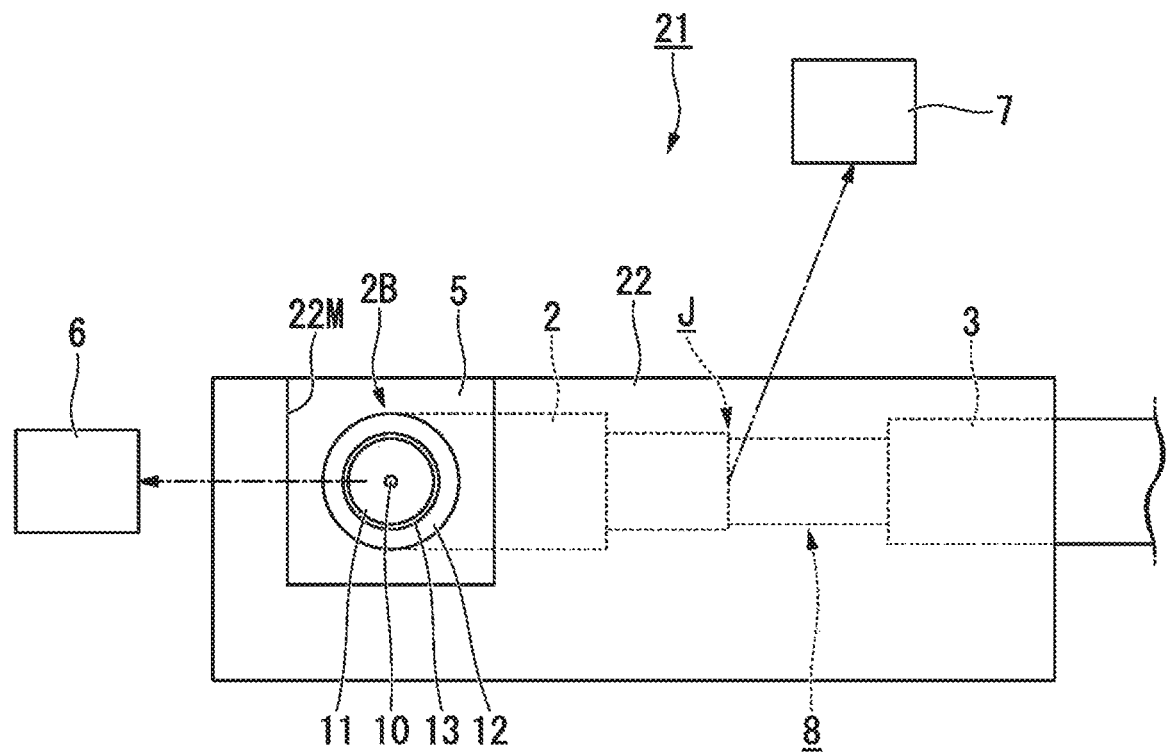
FIG. 4 is a side view of an optical power monitor device according to a second embodiment.

FIG. 4 is a side view of the optical power monitor device according to the second embodiment.

In FIG. 4, components in common with those in the drawings used in the first embodiment are denoted by the same reference numerals and signs, and a description thereof will not be repeated.

In the first embodiment, a light scattering property is imparted to the inner wall surface of the groove of the supporting member. On the other hand, as illustrated in FIG. 4, in an optical power monitor device 21 of this embodiment, a light scattering property is not imparted to the inner wall surface of a groove 22M of a supporting member 22. That is, a scatterer is not present inside the groove 22M, and the inner wall surface of the groove 22M is a flat surface. Further, the supporting member 22 is formed of a material, such as glass or a transparent resin, which has light transmittance. A reflected light monitoring optical detector 6 is disposed at a position facing the side surface of the supporting member 22 and corresponding to the outer side of a curve portion 2B. The other components are the same as those in the first embodiment.

Figure 3:
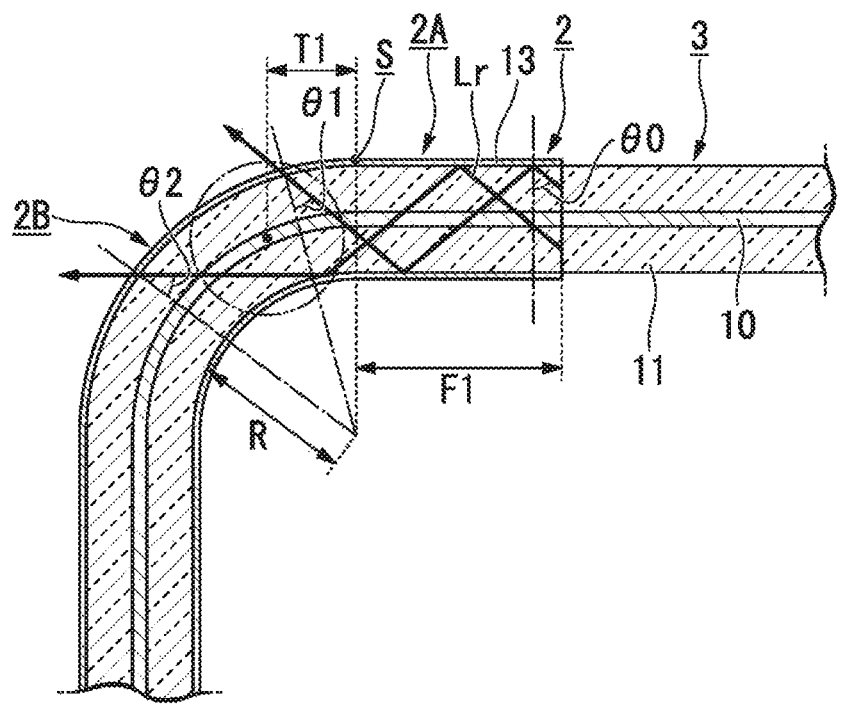
FIG. 3 is a diagram illustrating operations of the optical power monitor device.

As illustrated in FIG. 3 of the first embodiment, the reflected light Lr leaked out from the curve portion 213 advances toward the outer side of the curve portion 213 within a virtual plane (paper of FIG. 3) which includes the linear portion 2A and the curve portion 2B of the incidence-side optical fiber 2. Therefore, in a case of this embodiment, as illustrated in FIG. 4, reflected light Lr leaked out from the curve portion 2B is incident on the reflected light monitoring optical detector 6 through the supporting member 22 without being scattered on the inner wall surface of the groove 22M.

Also in this embodiment, it is possible to obtain an effect that the optical power monitor device capable of monitoring both an output optical power and a reflected light power with a high level of accuracy can be realized, and the effect is the same as that in the first embodiment. The configuration of the first embodiment or the configuration of the second embodiment may be adopted depending on conditions of a space in which the reflected light monitoring optical detector 6 can be disposed.

Third Embodiment

Hereinafter, a third embodiment of the invention will be described with reference to FIG. 5.

A basic configuration of an optical power monitor device according to the third embodiment is the same as that of the first embodiment and is a configuration in which a configuration on an incidence-side optical fiber side and a configuration on a launch-side optical fiber side are opposite to each other.

Figure 5:
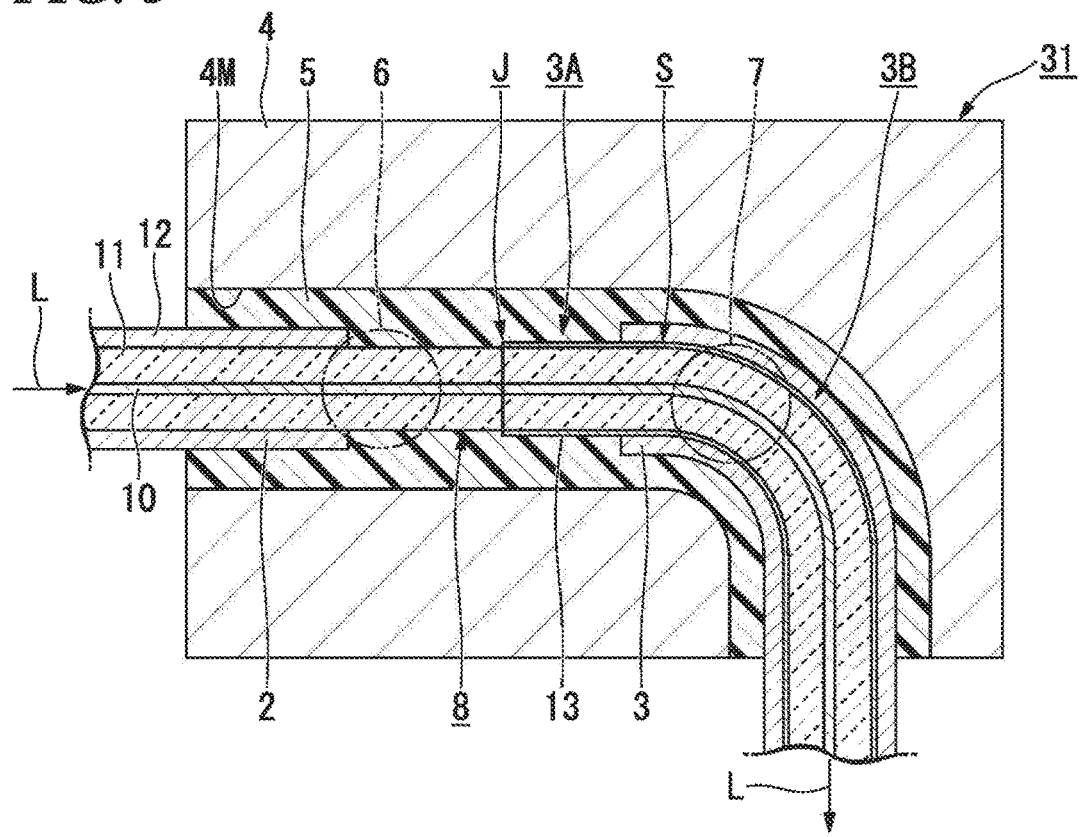
FIG. 5 is a cross-sectional view of an optical power monitor device according to a third embodiment.

FIG. 5 is a cross-sectional view of the optical power monitor device according to the third embodiment.

In FIG. 5, components in common with those in the drawings used in the first embodiment are denoted by the same reference numerals and signs, and a description thereof will not be repeated.

As illustrated in FIG. 5, in an optical power monitor device 31 of the third embodiment, a launch-side optical fiber 3 includes a linear portion 3A between a connection point J and a position at which the launch-side optical fiber 3 starts to be curved, and a curve portion 3B in which the launch-side optical fiber 3 is curved, contrary to the first embodiment. An incidence-side optical fiber 2 does not include a curve portion and includes only a linear portion. A low refractive index layer 13 having a refractive index lower than the refractive index of a cladding 11 is provided on the outer side of the cladding 11 of the launch-side optical fiber 3. The output light monitoring optical detector 7 is provided at a position overlapping the curve portion 3B of the launch-side optical fiber 3. A reflected light monitoring optical detector 6 is provided at a position overlapping the linear portion of the incidence-side optical fiber 2. The other components are the same as those in the first embodiment.

In a case of this embodiment, output light is trapped in the cladding 11 of the launch-side optical fiber 3, and thus it is possible to drastically reduce the output light which is leaked out from the connection point J and is detected by the reflected light monitoring optical detector 6. As a result, it is possible to increase the detection accuracy of a reflected light power of the reflected light monitoring optical detector 6. In addition, the output light monitoring optical detector 7 is located at a position distant from the connection point J, and thus it is possible to drastically reduce reflected light which is leaked out from the connection point J and is incident on the output light monitoring optical detector 7. As a result, it is possible to increase the detection accuracy of an output optical power of the output light monitoring optical detector 7.

Also in this embodiment, it is possible to obtain an effect that the optical power monitor device capable of monitoring both an output optical power and a reflected light power with a high level of accuracy can be realized, and the effect is the same as those in the first and second embodiments.

Fourth Embodiment

Hereinafter, a fourth embodiment of the invention will be described with reference to FIG. 6.

In the fourth embodiment, a basic configuration of an optical power monitor device is the same as that of the first embodiment, and a configuration on an incidence-side optical fiber side and a configuration on a launch-side optical fiber side are the same as those of the first embodiment.

Figure 6:
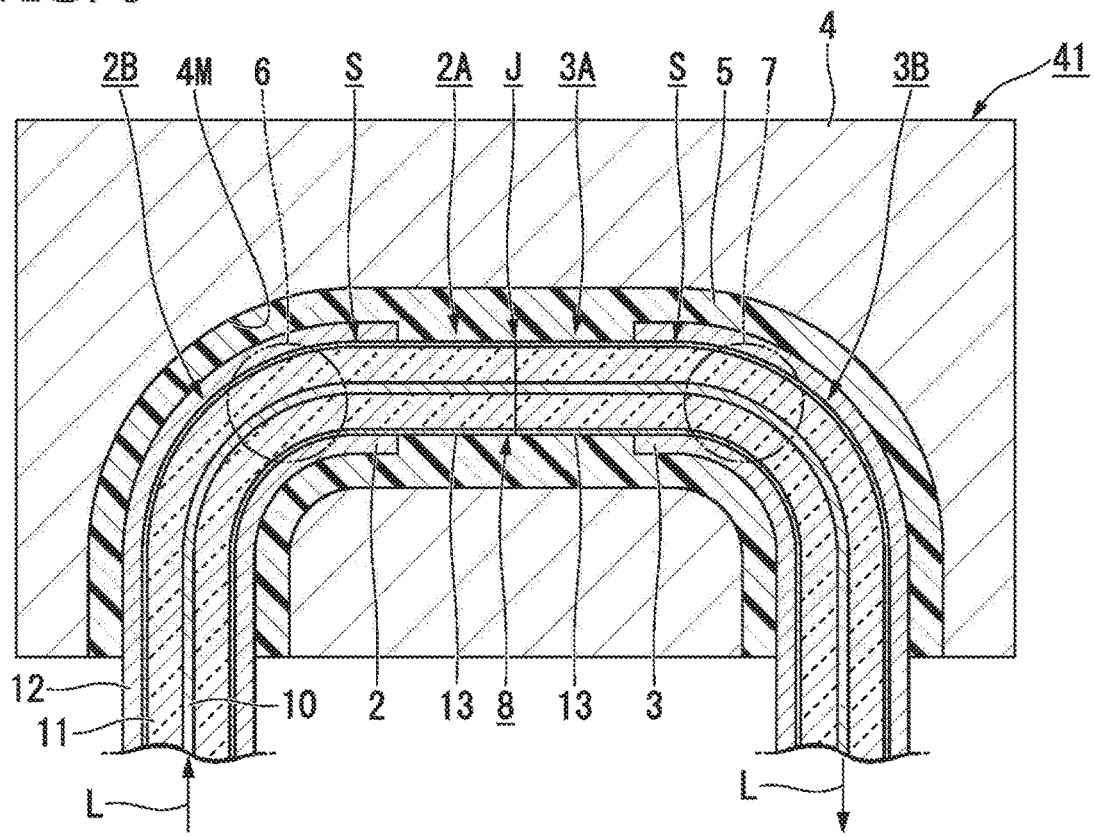
FIG. 6 is a cross-sectional view of an optical power monitor device according to a fourth embodiment.

FIG. 6 is a cross-sectional view of the optical power monitor device according to the fourth embodiment.

In FIG. 6, components in common with those in the drawings used in the first embodiment are denoted by the same reference numerals and signs, and a description thereof will not be repeated.

As illustrated in FIG. 6, an optical power monitor device 41 according to the fourth embodiment is configured such that an incidence-side optical fiber 2 side and a launch-side optical fiber 3 side are laterally symmetrical to each other centering on a connection point. That is, the incidence-side optical fiber 2 includes a linear portion 2A and a curve portion 2B, and the launch-side optical fiber 3 includes a linear portion 3A and a curve portion 3B. The low refractive index layer 13 is provided on the outer side of a cladding 11 of the incidence-side optical fiber 2 and the launch-side optical fiber 3. A reflected light monitoring optical detector 6 is provided at a position overlapping a curve portion 2B of the incidence-side optical fiber 2. An output light monitoring optical detector 7 is provided at a position overlapping a curve portion 3B of the launch-side optical fiber 3.

In a case of this embodiment, reflected light is trapped in the cladding 11 of the incidence-side optical fiber 2, and thus it is possible to drastically reduce the reflected light which is leaked out from a connection point and is detected by the output light monitoring optical detector 7. As a result, it is possible to increase the detection accuracy of an output optical power of the output light monitoring optical detector 7. Similarly, output light is trapped in the cladding 11 of the launch-side optical fiber 3, and thus it is possible to drastically reduce the output light which is leaked out from the connection point J and is detected by the reflected light monitoring optical detector 6. As a result, it is possible to increase the detection accuracy of a reflected light power of the reflected light monitoring optical detector 6.

Also in this embodiment, it is possible to obtain an effect that the optical power monitor device capable of monitoring both an output optical power and a reflected light power with a high level of accuracy can be realized, and the effect is the same as those in the first and second embodiments.

Fifth Embodiment

Hereinafter, a fifth embodiment of the invention will be described with reference to FIG. 7.

A basic configuration of an optical power monitor device according to the fifth embodiment is the same as that of the first embodiment, and the position of a reflected light monitoring optical detector is different from that in the first embodiment.

Figure 7:
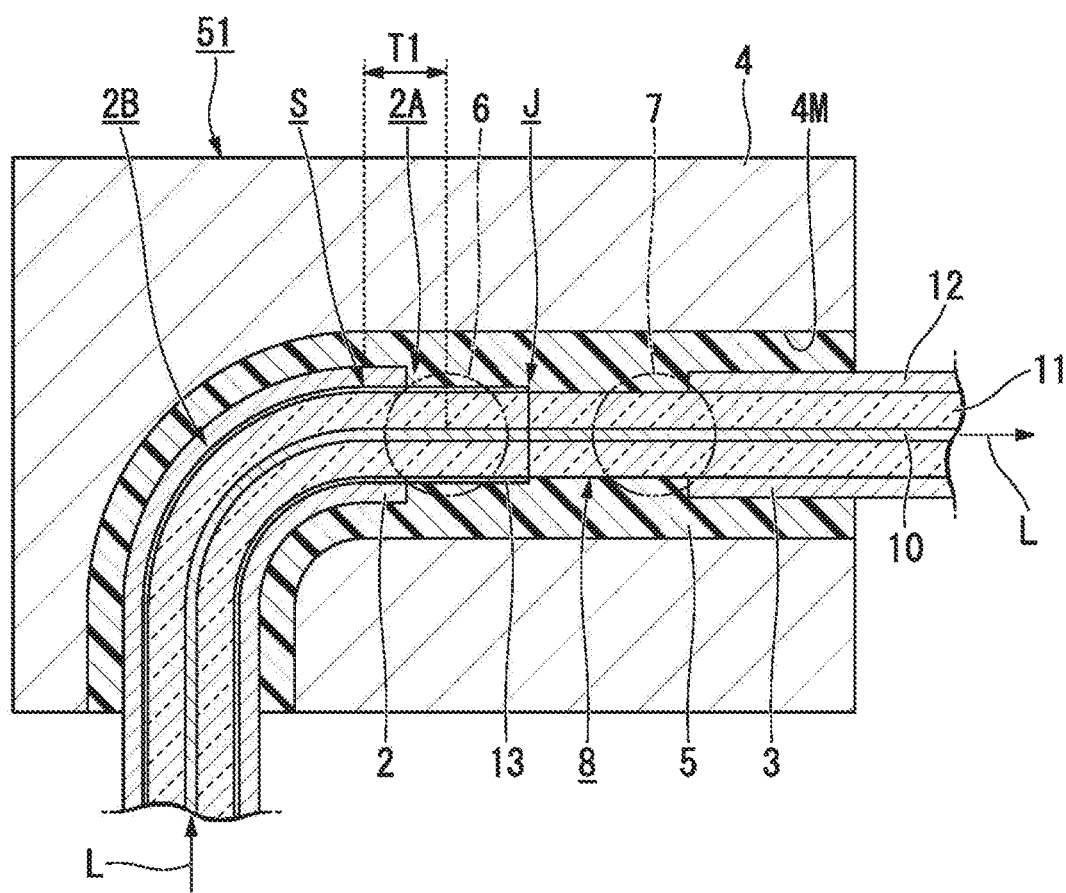
FIG. 7 is a cross-sectional view of an optical power monitor device according to a fifth embodiment.

FIG. 7 is a side view of the optical power monitor device according to the fifth embodiment.

In FIG. 7, components in common with those in the drawings used in the first embodiment are denoted by the same reference numerals and signs, and a description thereof will not be repeated.

In the first embodiment, a reflected light monitoring optical detector is provided at a position overlapping a curve portion of an incidence-side optical fiber. On the other hand, as illustrated in FIG. 7, in an optical power monitor device 51 of the fifth embodiment, a reflected light monitoring optical detector 6 is provided at a position overlapping a linear portion 2A of an incidence-side optical fiber 2. As a specific example, the reflected light monitoring optical detector 6 is provided above the linear portion 2A, for example, at a distance T1 of 5 mm from a curve start point S. The other components are the same as those in the first embodiment.

As illustrated in FIG. 2 of the first embodiment, reflected light leaked out from a curve portion 2B is scattered on the inner wall surface of a groove 4M and is then incident on the reflected light monitoring optical detector 6. For this reason, it is preferable that the reflected light monitoring optical detector 6 is disposed in the vicinity of the curve portion 2B. However, the reflected light monitoring optical detector 6 may not be necessarily provided at a position overlapping the curve portion 2B depending on conditions such as the degree of light scattering on the inner wall surface of the groove 4M and the sensitivity of the optical detector, as in this embodiment. However, when the position of the reflected light monitoring optical detector 6 is excessively close to a connection point J, there is a tendency for noise of output light leaked from the connection point J to be detected. Therefore, the reflected light monitoring optical detector 6 is required to be disposed at an appropriate position while considering a ratio between reflected light to be detected and output light which is noise.

Also in this embodiment, it is possible to obtain an effect that the optical power monitor device capable of monitoring both an output optical power and a reflected light power with a high level of accuracy can be realized, and the effect is the same as that in the first embodiment.

The scope of the invention is not limited to the above-described embodiments, and various modifications can be made without departing from the scope of the invention.

For example, in the above-described embodiments, examples of an optical power monitor device capable of monitoring both an output optical power and a reflected light power have been described. Instead of these configurations, the invention may be applied to an optical power monitor device that includes only one of an output light monitoring optical detector and a reflected light monitoring optical detector and monitors only one of an output optical power and a reflected light power.

In addition, a specific description of shapes, dimensions, arrangement, and materials of components of the optical power monitor device is not limited to the above-described embodiments, and modifications can be appropriately made.

INDUSTRIAL APPLICABILITY

The invention can be used for an optical power monitor device of a fiber laser used in, for example, a laser processing apparatus and the like.

What is claimed is:

1. An optical power monitor device comprising:
a first optical fiber comprising a core and a cladding surrounding the core, the first optical fiber being either one of an incidence-side optical fiber or a launch-side optical fiber, the incidence-side optical fiber and the launch-side optical fiber being connected to each other at a connection point and being constituted by a curve portion and a linear portion positioned between the curve portion and the connection point;
a second optical fiber being the other one of the incidence-side optical fiber or the launch-side optical fiber;
a low refractive index layer that is provided in at least a part of the linear portion on an outer side of the cladding and has a refractive index lower than a refractive index of the cladding;
a first optical detector that is provided at a position close to the curve portion, the first optical detector disposed on a first optical fiber side of the connection point and configured to detect a power of a light beam propagating in the first optical fiber from the connection point toward the first optical fiber; and
a second optical detector disposed on a second optical fiber side of the connection point and configured to detect a power of a light beam propagating in the second optical fiber from the connection point toward the second optical fiber.

2. The optical power monitor device according to claim 1, wherein one of the incidence-side optical fiber and the launch-side optical fiber is the first optical fiber, and the other is the second optical fiber constituting the linear portion, and
wherein the second optical detector is provided at a position overlapping the second optical fiber when seen in a plan view.

3. The optical power monitor device according to claim 1, further comprising:
a supporting member that comprises a groove accommodating the first optical fiber therein; and
a filler that is buried in a vicinity of the first optical fiber and has a refractive index equal to or higher than a refractive index of the cladding.

4. The optical power monitor device according to claim 3, wherein a part of inner surface of the groove which corresponds to a position of the curve portion has a light scattering property.

5. The optical power monitor device according to claim 3, wherein a part of inner surface of the groove which corresponds to a position of the connection point has a light absorbing property.

6. The optical power monitor device according to claim 1, wherein the first optical detector is provided at a position overlapping the curve portion of the first optical fiber when seen in a plan view.

7. The optical power monitor device according to claim 1, wherein the second optical fiber includes no low refractive index layer on the outer side of the cladding.

8. An optical power monitor method comprising:
preparing a first optical fiber which comprises a core and a cladding surrounding the core and is either one of an incidence-side optical fiber or a launch-side optical fiber, the incidence-side optical fiber and the launch-side optical fiber being connected to each other at a connection point, and a second optical fiber which is the other one of the incidence-side optical fiber or the launch-side optical fiber;

providing a low refractive index layer having a refractive index lower than a refractive index of the cladding in at least a portion on an outer side of the cladding;

providing a first optical detector which is disposed on a first optical fiber side of the connection point;

providing a second optical detector which is disposed on a second optical fiber side of the connection point;

forming a curve portion by curving a portion of the first optical fiber;

detecting, by the first optical detector, leaked light of output light or reflected light, which is guided toward the curve portion from the connection point, in the curve portion; and detecting, by the second optical detector, leaked light of output light or reflected light, which propagates toward the second optical fiber from the connection point.

9. The optical power monitor method according to claim 8, further comprising:

providing the second optical fiber without the low refractive index layer on the outer side of the cladding.

10. An optical power monitor device comprising:

a first optical fiber comprising a cote and a cladding surrounding the core, the first optical fiber being either one of an incidence-side optical fiber or a launch-side optical fiber, the incidence-side optical fiber and the launch-side optical fiber being connected to each other at a connection point and being constituted by a curve portion and a linear portion positioned between the curve portion and the connection point;

a second optical fiber being the other one of the incidence-side optical fiber or the launch-side optical fiber;

a low refractive index layer that is provided in at least a part of the linear portion on an outer side of the cladding and has a refractive index lower than a refractive index of the cladding; and a first optical detector that is provided at a position close to the curve portion, wherein the second optical fiber includes no low refractive index layer on the outer side of the cladding.

11. An optical power monitor method comprising:

preparing a first optical fiber which comprises a core and a cladding surrounding the core and is either one of an incidence-side optical fiber or a launch-side optical fiber, the incidence-side optical fiber and the launch-side optical fiber being connected to each other at a connection point, and a second optical fiber which is the other one of the incidence-side optical fiber or the launch-side optical fiber;

forming a curve portion by curving a portion of the first optical fiber;

forming a linear portion positioned between the curve portion of the first optical fiber and the connection point; providing a low refractive index layer having a refractive index lower than a refractive index of the cladding in at least a portion on an outer side of the cladding of the linear portion;

providing the second optical fiber without the low refractive index layer on the outer side of the cladding; and detecting leaked light of output light or reflected light, which is guided toward the curve portion from the connection point, in the curve portion.

* * * * *